(No Model.)

J. SCHMIDLAPP.
VEHICLE SPRING.

No. 429,247.  Patented June 3, 1890.

Attest:
A. N. Jesbera
E. M. Watson

Inventor:
Jacob Schmidlapp
By David A. N. Burr
Atty.

UNITED STATES PATENT OFFICE.

JACOB SCHMIDLAPP, OF NEW YORK, N. Y.

VEHICLE-SPRING.

SPECIFICATION forming part of Letters Patent No. 429,247, dated June 3, 1890.

Application filed April 1, 1890. Serial No. 346,192. (No model.)

*To all whom it may concern:*

Be it known that I, JACOB SCHMIDLAPP, of the city, county, and State of New York, have invented certain new and useful Improvements in Vehicle-Springs; and I do hereby declare that the following is a full and exact description thereof, reference being had to the accompanying drawings, and to the letters of reference marked thereon, making a part of this specification.

My invention relates to the spring-supports interposed between the fifth-wheel of a hook-and-ladder truck or other heavy vehicle and its axle, and has for its object to steady the fifth-wheel by affording it support at four different points upon springs which shall have perfect freedom of play to develop fully their resilient power and be so braced and guarded as to render the bearing which they afford exceedingly firm and stable.

It consists in improved means, substantially as hereinafter described and claimed, for connecting and combining elliptic and semi-elliptic springs with the axle and fifth-wheel of a vehicle.

Figure 1:
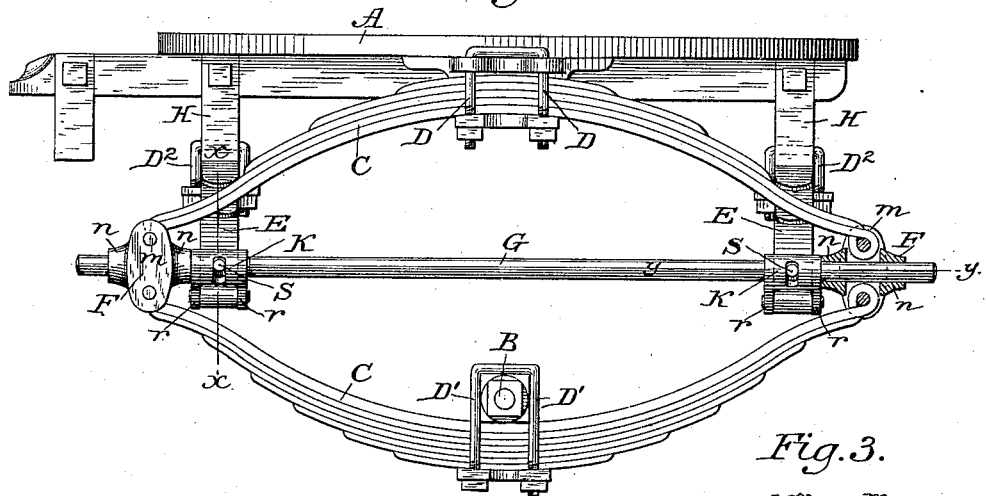
Figure 3:
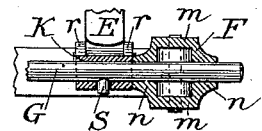
Figure 2:
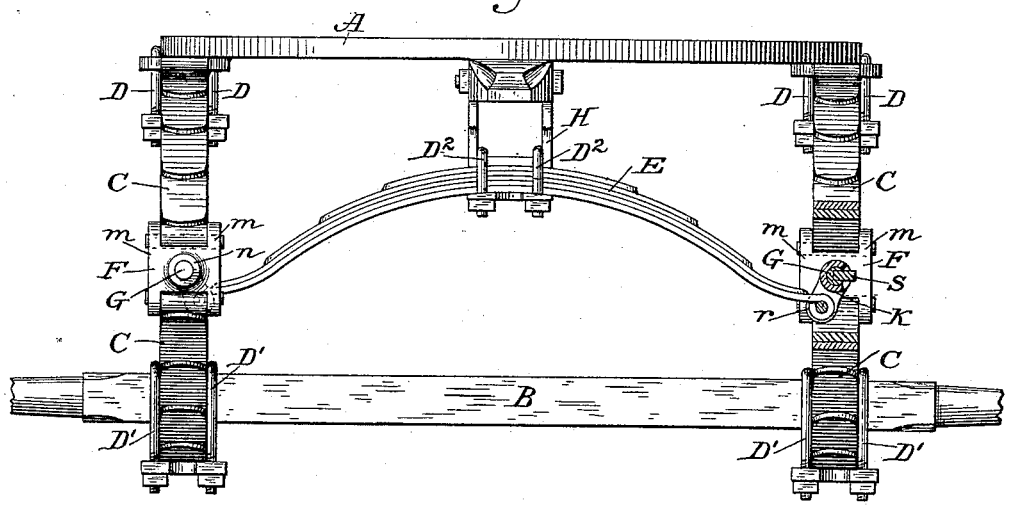

In the accompanying drawings, Figure 1 is a side elevation of the fifth-wheel and its spring-supports in a hook-and-ladder truck, the wheels being removed from the axle and the construction of the coupling-head at one end of the elliptic spring illustrated by a vertical central section thereof. Fig. 2 is a front view of the same with the elliptical spring at the right and the coupling for the semi-elliptic spring connected thereto, in section, upon the line $x \, x$ of Fig. 1. Fig. 3 is a detail longitudinal section at the end of one of the elliptic springs in line $y \, y$ of Fig. 1.

In said drawings, A represents the fifth-wheel in a hook-and-ladder truck, and B the axle under the same. The fifth-wheel is united to the axle and supported thereon by means of two full elliptic springs C C. These springs are placed under the fifth-wheel at diametrically-opposite points thereof, and secured thereto in the customary manner by suitable clips D D, as shown, and are in like manner hung upon the axle by means of clips D' D', the axle being carried transverely between the divisions of the springs to rest upon the lower division of each in the usual manner, as shown in Fig. 1.

My invention is directed specially to the provision of an auxiliary support for the fifth-wheel by means of auxiliary semi-elliptic springs E E, mounted at right angles to the elliptic springs C C, and made to furnish a bearing for the fifth-wheel at diametric points equidistant from the supporting-points of said elliptic springs. To this end the lower division of each elliptic spring C is made heavier and stronger than the upper division by means of additional leaves, as shown in Fig. 1, and the ends of these springs are confined in heads F F, whose side plates $m \, m$ (see Figs. 1 and 3) are united by transverse plates $n \, n$, (see Figs. 2 and 3,) which are centrally perforated to permit of the passage of a rod G through them between the transverse bolts fitted in the side plates $m \, m$, and by which the ends of the spring-plates are secured in the usual manner. The rod G is thus supported loosely in said heads midway between the two divisions of the spring, as shown in Fig. 1. The transverse plates $n \, n$ are thickened somewhat to furnish an extended bearing for the ends of the rod G, which is left free to play loosely therein.

The semi-elliptic springs E E are secured centrally by means of clips $D^2 \, D^2$, each to a dependent bracket H, secured to the fifth-wheel midway between the bearings for the elliptic springs, and the ends of each spring E are pivoted between lugs $r \, r$, projecting from sleeves K K, (see Fig. 1,) fitted to rotate upon the rods G G, near to the heads F of the elliptic springs C C. Each of said sleeves K, while left free to rotate upon its rod G, is prevented from moving longitudinally thereon by means of a pin S, fitted in the rod to project through a transverse peripheral slot in the sleeve, as shown in the section thereof in Fig. 2. The sleeves K K, thus pinned to the rods inside of the heads F F, serve to prevent the withdrawal of the rods from the heads.

In the operation of the springs thus hung and adjusted the elliptic springs C C are braced by the rods G G, passing through the heads F F, the freedom of action of the springs being unrestricted, in view of the free longitudinal play of said heads upon the ends of the rods, while the semi-elliptic springs E E are brought into action to complement the elliptic springs and serve as auxiliaries thereto in supporting the fifth-wheel at points midway between the supports which the elliptic springs afford, the whole operating harmoniously and efficiently to produce a remarkably steady and easy bearing for the vehicle, peculiarly adapted to resist violent strains thereon.

I claim as my invention—

1. The combination, with the elliptic springs each having perforated heads and a central rod playing loosely through said heads, of the sleeves fitted to revolve upon each rod, and a transverse semi-elliptic spring having its ends pivoted to said sleeves, substantially in the manner and for the purpose herein set forth.

2. The combination, in the running-gear of a truck or other vehicle and with its fifth-wheel, of elliptic springs interposed directly between the fifth-wheel and the axle, each having a central rod fitted to play loosely through the ends of the spring, and semi-elliptic springs fitted under the fifth-wheel at right angles to the elliptic springs, and each pivoted to a sleeve pivoted upon one of the rods in said elliptic springs, substantially in the manner and for the purpose herein set forth.

In testimony whereof I have signed my name to this specification in the presence of two subscribing witnesses.

JACOB SCHMIDLAPP.

Witnesses:
A. N. JESBERA,
E. M. WATSON.